United States Patent [19]

Kondou et al.

[11] Patent Number: 4,480,170
[45] Date of Patent: Oct. 30, 1984

[54] ARC SPOT WELDING EQUIPMENT

[75] Inventors: Masatsune Kondou, Okazaki; Kazuhiro Itou; Tsutomu Furuta, both of Toyota, all of Japan

[73] Assignee: Toyota Jidosha Kabushiki Kaisha, Toyota, Japan

[21] Appl. No.: 479,846

[22] Filed: Mar. 28, 1983

[30] Foreign Application Priority Data

Mar. 30, 1982 [JP] Japan ................................ 57-045249

[51] Int. Cl.³ .......................... B23K 9/12; B21J 13/08
[52] U.S. Cl. ................................ 219/125.1; 219/127; 219/161; 219/86.24; 901/42
[58] Field of Search ...................... 219/127, 136, 125.1, 219/137.2, 161, 86.24; 901/42, 31, 50, 39, 41

[56] References Cited
U.S. PATENT DOCUMENTS 3,366,773 1/1968 Edge et al. ........................... 219/127

4,347,426 8/1982 Ware et al. ........................ 219/125.1

FOREIGN PATENT DOCUMENTS 1800090 9/1970 Fed. Rep. of Germany ........ 901/31
595144 4/1978 U.S.S.R. ................................ 901/31

Primary Examiner—C. L. Albritton
Assistant Examiner—C. M. Sigda
Attorney, Agent, or Firm—Cushman, Darby & Cushman

[57] ABSTRACT

An arc spot welding equipment wherein a hand having a positioning and clamping device for a work and a welding torch is attached to an arm of an industrial robot. The small work is clamped in a predetermined positional relation to the welding torch and is moved by the arm of the robot to an object to which said work is to be welded, thereby realizing an automatic positioning of the work to the object and eliminating the need to prepare a large-scale jig for positioning and clamping work to reduce the cost of the equipment.

12 Claims, 7 Drawing Figures

FIG.1 (PRIOR ART)
FIG.2 (PRIOR ART)
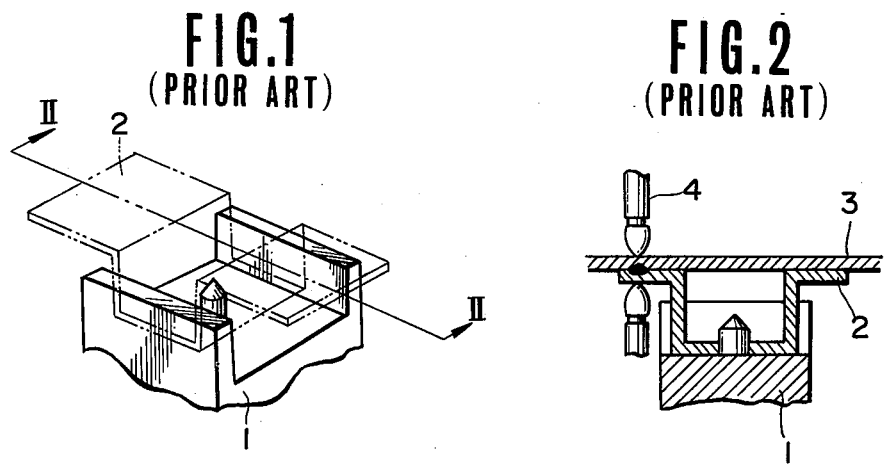
FIG.3 (PRIOR ART)
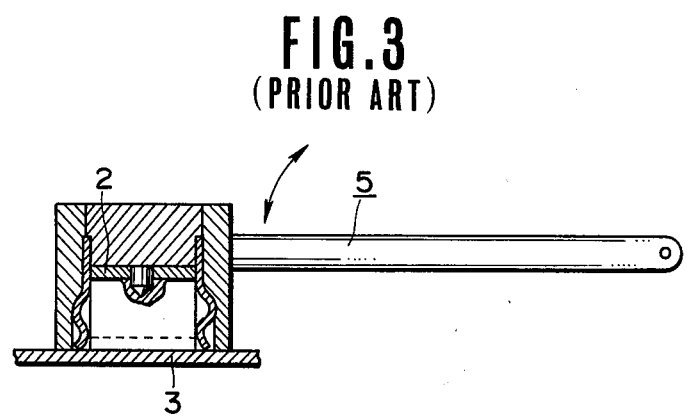
FIG.4 (PRIOR ART)
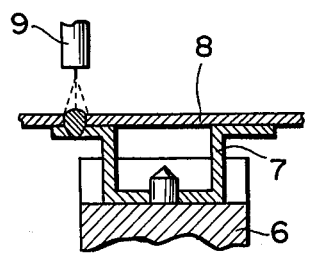

ARC SPOT WELDING EQUIPMENT

BACKGROUND OF THE INVENTION

1. Field of the Invention

The present invention relates to an arc spot welding equipment utilizing an industrial robot and more particularly to an arc spot welding equipment for use in an automatic welding of small works.

2. Description of the Prior Art

Resistance welding or arc welding is used for welding various brackets and other works to objects such as automotive floors and the like.

In the resistance welding, a work 2 is positioned by a jig 1 and applied to an object 3 and a spot welding is performed by means of a resistance welder 4, as shown in FIG. 1 and FIG. 2, or a swing type jig 5 is used to hole the work 2 and welding is performed, as shown in FIG. 3. Consequently, the welding equipment becomes large-scaled and equipment cost increases. Increase of the equipment scale not only leads to a large loss of space but also is disadvantageous in the aspect of work management. Also in the aspect of maintenance such an increased equipment scale incurs a serious loss. Besides, there arises a problem such that in case the shape of the object is changed because of a model change of the automobile or the like to which the work is attached, it is difficult to utilize the same equipment as that used in the former model.

On the other hand, in the arc welding, a work 7 is held and positioned relative to an object 8 by means of a jig 6 and then arc welding is performed by a welding torch 9, as shown in FIG. 4. Thus, a work positioning device is needed and a large-scale jig must be provided, resulting in increase of the equipment cost and a large loss in the maintenance of the equipment. Besides, in the event of a model change as referred to above, it is difficult to utilize the jig used before the model change as that to be used after the model change. Furthermore, the operation for setting the work to the jig is mostly performed manually by the operator, and the automation therefor is scarcely realized.

SUMMARY OF THE INVENTION

The object of the present invention is to realize an automatic positioning of a work to be welded to an object.

Another object of the present invention is to attain reduction of equipment cost and improvement of maintainability as well as making the arc spot welding equipment for works before the model change utilizable as that after the model change.

Sill another object of the present invention is to permit automation of the operation for setting a work onto an object, thereby to realize automation of a series of welding steps and attaining man power saving in the welding process.

The above-mentioned objects can be achieved by the arc spot welding equipment of the present invention wherein a hand having a positioning and clamping device and an arc spot welding torch is attached to the end of an arm of an industrial robot capable of controlling the position of the end of the arm. According to the arc spot welding equipment of the present invention, a work is positioned relative to the welding torch by means of the positioning and clamping device, then positioned and set to an object by a controlled movement of the arm of the industrial robot, and then arc spot welded to the object. Because the industrial robot is utilizable for the positioning control, it is no longer necessary to use an exclusive and expensive work positioning device as needed in the prior art. Therefore, the cost of the equipment is considerably reduced and the maintenance thereof becomes easier. Besides, since the positioning of the work to the object is performed by the positioning and clamping device and the arm of the industrial robot, said positioning has nothing to do with a change of the shape and dimension of the jig of the conventional arc spot welding device necessitated by model change of a vehicle, and therefore, the designs of the positioning and clamping device and the arm of the industrial robot are not needed to be changed.

Furthermore, a series of arc welding operations, namely, positioning of the work relative to the welding torch, clamping of the work, moving of the work to the welding position of the object, and execution of welding, are performed by the industrial robot and the work positioning and clamping device attached to the arm of the robot. Thus, those operations are automatically performed without requiring man power.

BRIEF DESCRIPTION OF THE DRAWINGS

The above and other objects, features and advantages of the invention will become apparent and more readily appreciated from the following detailed description of present preferred exemplary embodiments of the invention, taken in conjunction with the accompanying drawings, of which:

FIG. 1 is a partial perspective view of a jig portion of a conventional resistance spot welding equipment;

FIG. 2 is a longitudinal sectional view taken on line II—II of FIG. 1, showing a state of resistance spot welding;

FIG. 3 is a longitudinal sectional view showing another example of a work setting portion of a conventional resistance spot welding equipment;

FIG. 4 is a longitudinal sectional view of a work setting portion of a conventional arc spot welding equipment;

DETAILED DESCRIPTION OF THE PREFERRED EMBODIMENTS

Figure 5:
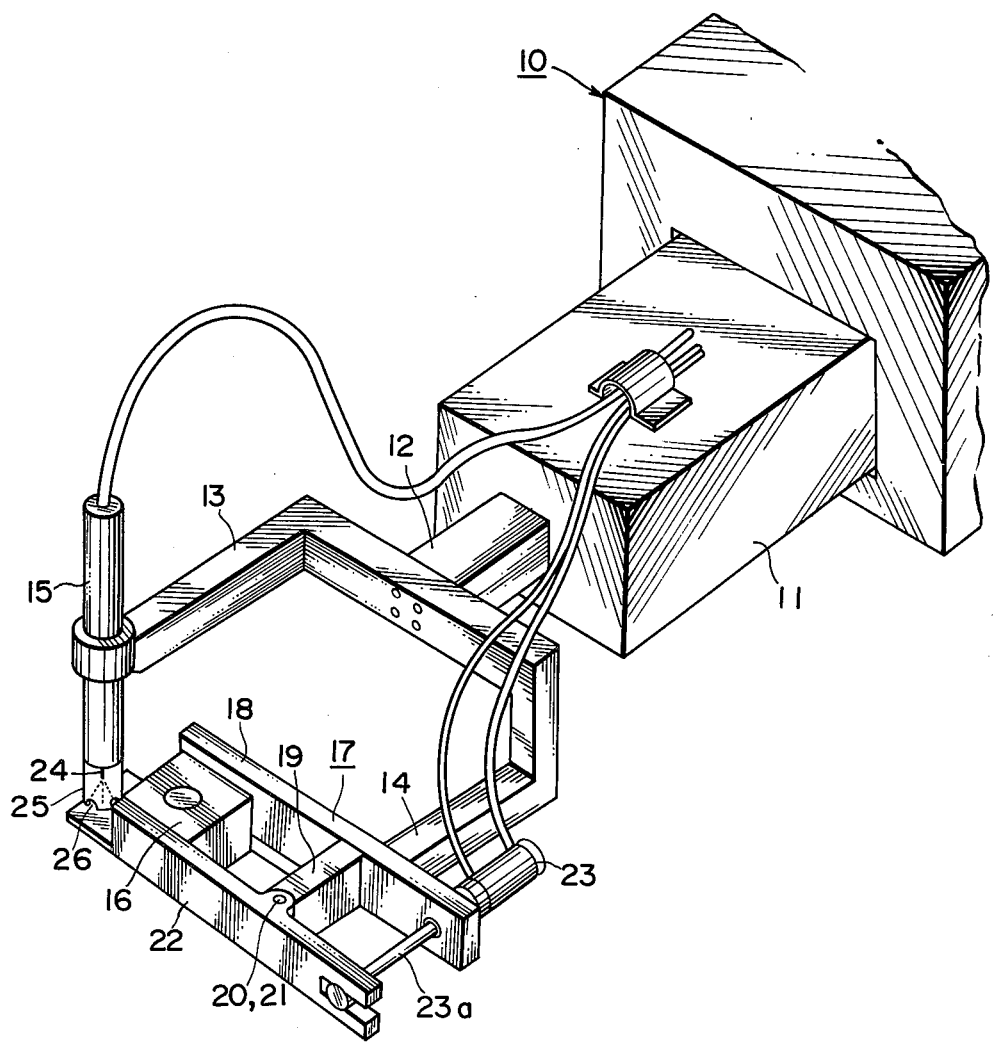
FIG. 5 is a perspective view of an arc spot welding equipment according to a first embodiment of the present invention.
Figure 6:
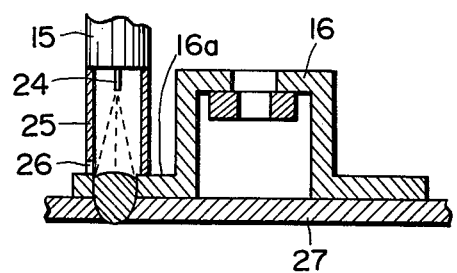
FIG. 6 is a partially longitudinal sectional view of the equipment of FIG. 5.

Referring to FIGS. 5 and 6, there are shown an arc spot welding equipment according to the first embodiment of the present invention in which the reference numeral 10 designates an industrial robot having an arm 11. The end of the arm 11 of the robot 10 is controlled to be positioned. A hand 12 having a first finger 13 and a second finger 14 is attached to the end of the arm 11. A welding torch 15 is fixedly supported by the end of the first finger 13, while a positioning and clamping device 17 for a work 16 is attached to the end of the second finger 14.

The positioning and clamping device 17 has a member 18 fixed to the end of the second finger 14 of the hand 12 and extending toward the welding torch 15, and a rocking member 22 extending in parallel with the member 18 pivoted at the end of the support portion 19 of the member 18 through a pin hole 20 and a pin 21 provided at said end of the support portion 19 of the member 18. The member 18 has the support portion 19 in a body therewith and the support portion 19 extends in the direction orthogonal to the member 18. The member 18 and the rocking member 22 are disposed so that their insides are opposed to each other. By a pivotal motion of the rocking member 22, the work 16 can be clamped in the predetermined direction and position between the members 18 and 22. Both a face of the member 18 opposing to the rocking member 22 and a face of the member 19 facing the welding torch 15 serve as the faces for positioning the work 16. A face of the rocking member 22 opposing to the member 18 serves as a face for pressing the work 16 when the work 16 is clamped. By those three faces the work 16 is positioned relative to the member 18 and the support portion 19. The pivotal motion of the rocking member 22 for clamping the work 16 is effected by means of an air cylinder 23 which is supported by the end portion opposite to the clamping end for the work 16 of the member 18. The air cylinder 23 is provided with a rod 23a, and the end of the rocking member 22 is connected to the end of the rod 23a slidably in the longitudinal direction of the rocking member 22. The air cylinder 23, which may be substituted by a hydraulic cylinder, is connected through pipes to a solenoid valve (not shown).

The welding torch 15 has the predetermined positional relation to the positioning and clamping device 17. More specifically, said welding torch 15 and said positioning and clamping device 17 have such a positional relation that a wire 24 of the welding torch 15 is fed with an appropriate spacing to the portion to be arc spot welded of the work 16 which has been clamped in a predetermined position of the positioning and clamping device 17. Between the end of the welding torch 15 and the work face 16a is provided a cylindrical work presser 25 around the wire 24 for pressing the work 16 with spacing. The work presser 25, which is formed of an insulator, is attached to the end of the welding torch 15. The length of the work presser 25 is set at the total length of a projecting length of the wire 24 projecting from the welding torch 15 and the length of arc generated from the wire 24. It is set so as to give an appropriate arc length. A degassing hole 26 is formed in the cylindrical side portion at the end of the work presser 25 on the side contacting with the work 16.

The operation of the arc spot welding equipment having the above-mentioned construction will now be explained.

The work 16 is clamped between the members 18 and 22 of the positioning and clamping device 17 by operation of the air cylinder 23 and positioned in the predetermined position relative to the member 18 and the support portion 19 of the member 18, and then by movement of the arm 11 of the industrial robot 10, it is set to a predetermined position of an object 27 which has been set at a predetermined place of the body of a vehicle. At a signal corresponding to the completion of the setting of the work 16, the arc spot welding of the work 16 to the object 27 commences, and the work 16 is arc spot welded to the object 27 under appropriate present conditions of welding current, welding time, etc.

In this arc spot welding, the work 16 is abutted on two faces, namely, the face of the member 18 and the face of the support portion 19, and clamped by the rocking member 22, whereby its positional relation to the positioning and clamping device 17 is determined. Since the member 18 and the support portion 19 of the positioning and clamping device 17 are in a predetermined positional relation to the welding torch 15 through the fingers 13 and 14 of the hand 12, the work 16 which has been positioned and clamped by the positioning and clamping device 17 is in a predetermined positional relation to the welding torch 15. In this case, the arc generating point of the welding torch 15 is just directed to the portion to be welded of the clamped work 16. The work 16 is positioned in a predetermined position relative to the object 27 by means of the industrial robot 10 in the state that said work 16 is held in the aforesaid predetermined positional relation to the welding torch 15. Further, as shown in FIG. 6, since the welding torch 15 and the work 16 are appropriately spaced from each other through the work presser 25, the arc length is maintained at an appropriate length.

Since in a series of operations, the clamping, positioning and setting steps of the work 16 are performed by the arm 11 of the industrial robot 10 and the positioning and clamping device 17 attached to the arm 11, it is possible to save man power.

Furthermore, even if the shape and dimension of the object 27 are changed as a result of a model change of the automobile or the like to which the object is attached, it is not necessary to revise the positioning and clamping device 17 and the welding torch 15, because the positioning and clamping device 17 and the welding torch 15 are attached to the industrial robot 10, and thus it is easier to cope with such automative model change than in the conventional welding device wherein a work is positioned and fixed by a jig.

Figure 7:
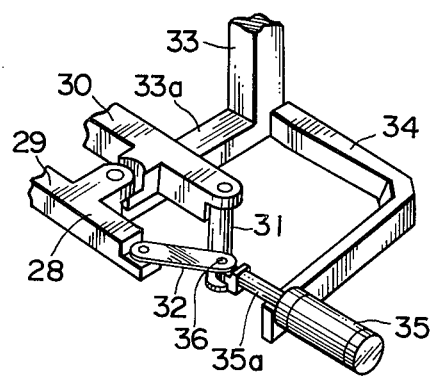
FIG. 7 is a partial perspective view of an arc spot welding equipment according to a second embodiment of the present invention.

Referring now to FIG. 7, there is shown an end portion of a hand in an arc spot welding equipment according to the second embodiment of the present invention. In this embodiment, a positioning and clamping device 28 is composed of rocker members 29 and 30, a pair of links 31 and 32 pivotally connected to end portions of the rocker members 29 and 30, and an air cylinder 35 having a rod 35a the end of which is pivotally connected to end portions of the links 31 and 32. The air cylinder 35 is supported by a third finger 34 integral with a second finger 33 of the hand. The second finger 33 of the hand extends below the rocker member 30, and a face 33a of the second finger 33 facing the welding torch serves as a face for positioning a work. The rocker members 29 and 30 are each formed of a rectilinearly extending portion and a portion extending perpendicularly to the rectilinear portion in an intermediate position of said rectilinearly extending portion. The perpendicularly extending portions of rocker members 29 and 30 are connected to the second finger 33 pivotally with one another. The links 31 and 32 are interconnected at their end portions through a pin 36 together with the end of the rod 35a so as to pivot on the pin 36.

In the equipment having the above-mentioned construction, the links 31 and 32 are moved between open and closed positions by operation of the air cylinder 35, and the rocker members 29 and 30 are operated in the same manner through the links 31 and 32, whereby the work is clamped. In clamping of the work, one face of the work is abutted with the face 33a of the second finger 33 and then other two faces of the work are positioned by the closing motion of the rocker members 29 and 30. Other constructional and operational details are the same as in the first embodiment.

It will be readily understood from the above description that the following various effects are attained by the arc spot welding equipment of the present invention.

First of all, by connecting the hand 12 having the positioning and clamping device 17 or 28 and the welding torch 15 to the arm 11 of the industrial robot 10, an automatic positioning of the work 16 to the object 27 is realized, and thus man power is saved.

Furthermore, the conventional large-scale positioning jig is no longer needed, and consequently not only the equipment cost can be reduced to a great extent but also a remarkable improvement can be attained with respect to maintainability.

Additionally, the arc spot welding equipment will easily meet the model change of vehicles.

Although only preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed:

1. An arc spot welding equipment comprising:
   an arm of an industrial robot, the end of said arm being capable to be positioned;
   a hand having a first finger and a second finger, said hand being attached to the end of arm of said robot;
   a positioning and clamping device attached to the second finger for positioning and clamping a work to be welded to an object relative to said hand; and
   a welding torch attached to the first finger in the state that an arc generating portion of said welding torch is directed to a portion of said work where said work is welded to an object.

2. An arc spot welding equipment as defined in claim 1, wherein said positioning and clamping device comprises:
   a support member having a support portion extending in the direction orthogonal to said support member and fixed to the second finger; and
   a rocking member adapted to respect to said support member.

3. An arc spot welding equipment as defined in claim 2, wherein said support member has two faces coming into contact with two faces of said work respectively and positioning said work relative to said positioning and clamping device.

4. An arc spot welding equipment as defined in claim 2, wherein said rocking member is slidably connected to an air cylinder to enable relative movement in the longitudinal direction of said rocking member.

5. An arc spot welding equipment as defined in claim 1, wherein said positioning and clamping device comprises two rocker members attached to the second finger, said two rocker members being pivotally connected to each other.

6. An arc spot welding equipment as defined in claim 5, wherein each of said two rocker members comprises a rectilinearly extending portion and a portion extending perpendicularly to said rectilinearly extending portion in an intermediate position of said rectilinearly extending portion, said perpendicularly extending portion of each of said two rocker members being pivotally connected to the second finger with one another.

7. An arc spot welding equipment as defined in claim 6, wherein the opposed faces of said two rocker members and a side face of the second finger constitute faces for positioning said work with respect to said hand.

8. An arc spot welding equipment as defined in claim 6, wherein two links are pivotally connected to respective end portions of said two rocker members and said two links are pivotally interconnected to a rod of an air cylinder.

9. An arc spot welding equipment as defined in claim 1, wherein a cylindrical work presser is attached to said welding torch.

10. An arc spot welding equipment as defined in claim 9, wherein said work presser comprises an insulator.

11. An arc spot welding equipment as defined in claim 9, wherein a length of said work presser is set at a total length of a projecting length of a wire projecting from said welding torch and an arc length.

12. An arc spot welding equipment as defined in claim 9, wherein said work presser has a degassing hole formed in a side wall portion thereof.

* * * * *